US006480677B1

(12) United States Patent
Uno

(10) Patent No.: US 6,480,677 B1
(45) Date of Patent: Nov. 12, 2002

(54) ZOOMING AND FOCUSING MECHANISM OF CAMERA

(75) Inventor: Tetsuya Uno, Sakai (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/487,494

(22) Filed: Jan. 19, 2000

(30) Foreign Application Priority Data

Jan. 20, 1999 (JP) .......................................... 11-011607

(51) Int. Cl.[7] .......................... G03B 17/00; G02B 15/14
(52) U.S. Cl. ......................................... 396/83; 359/701
(58) Field of Search ....................... 396/79–83; 359/696, 359/697, 698, 699, 700, 701

(56) References Cited

U.S. PATENT DOCUMENTS

| 5,752,095 A | * | 5/1998 | Tsuboi ....................... 396/60 X |
| 5,790,901 A | | 8/1998 | Nakayama et al. ............ 396/82 |
| 5,875,359 A | | 2/1999 | Ohtake et al. ................. 396/80 |
| 6,108,146 A | * | 8/2000 | Kenin et al. ............. 359/700 X |
| 6,195,212 B1 | * | 2/2001 | Miyamoto ................... 359/699 |

FOREIGN PATENT DOCUMENTS

| JP | 05072594 | 3/1993 | ............ G03B/5/00 |
| JP | 08146296 | 6/1996 | ........... G02B/15/20 |

* cited by examiner

Primary Examiner—W. B. Perkey
(74) Attorney, Agent, or Firm—Burns, Doane, Swecker & Mathis, LLP

(57) ABSTRACT

A single mechanism of a camera which performs zooming and focusing operations. The mechanism has a first lens group which performs focusing operation, a second lens group which moves relative to the first lens group to perform zooming operation, and a zoom lens barrel which carries the first lens group and the second lens group, so that each of the first lens group and the second lens group moves along a zooming line including a plurality of focusing sections and a plurality of zooming sections alternately. A forwarding amount of the first lens group in one of the focusing sections is different from that in at least one of the other focusing sections.

10 Claims, 14 Drawing Sheets

ZOOMING AND FOCUSING MECHANISM OF CAMERA

This application is based on application No. 11-11607 filed in Japan, the contents of which are hereby incorporated by reference.

BACKGROUND OF THE INVENTION

1. Field of the Invention

The present invention generally relates to a camera, and particularly to the camera in which zooming operation and focusing operation are performed with one single driving mechanism.

2. Description of the Related Art

As a construction for realizing miniaturization and cost down of a zoom lens barrel, there has conventionally been known a single driving mechanism for both zooming and focusing operations. In general, in the zoom lens barrel utilizing a first lens group and a second lens group, the focusing operation is performed with the first lens group (namely, the first component) which locates on front side. In the single driving mechanism for both zooming and focusing operations, each lens group moves along one zooming line in which zooming sections and focusing sections are alternately repeated. Therefore, the first lens group moves always linearly to a rotational angle of a cam barrel. This example will be explained below with reference to FIGS. 1A and 1B.

FIGS. 1A and 1B show one example of a zooming line diagram of a two-component zoom lens barrel which performs the focusing operation with the first lens group (first component). This zoom lens barrel, like the embodiments of the present invention described later, comprises a fixed barrel which is immobilized to a camera body, a cam barrel (rotatable barrel) which advances or retreats relative to the fixed barrel, and a first lens group and a second lens group each of which advances or retreats relative to the cam barrel.

In FIG. 1A, a straight line 1 represents a forwarding lead of the cam barrel relative to the fixed barrel, a straight line 3 represents a forwarding lead of the first lens group (first component) relative to the cam barrel, and a stepped line 2 represents a forwarding lead of the second lens group (second component) relative to the cam barrel. Therefore, a forwarding amount of the first lens group relative to the fixed barrel is represented by a sum of the straight lines 1 and 3, which is represented by a straight line 13 in FIG. 1B. Likewise, a forwarding amount of the second lens group relative to the fixed barrel is represented by a sum of the straight line 1 and the stepped line 2, which is represented by a stepped line 12 in FIG. 1B.

This zoom lens barrel performs a stepped zooming operation including six steps in total, which are: telephoto step "T", wideangle step "W" and four steps "M1" to "M4" therebetween. The focusing operation is performed in a plurality of areas corresponding to horizontal sections (focusing sections) of the stepped line 12, and the zooming operation is performed in areas corresponding to other sections (zooming sections) of the stepped line 12. Thus, in the single driving mechanism for both zooming and focusing operations, each lens group moves along one zooming line in which zooming sections and focusing sections are alternately repeated.

As to a curved line 2' in FIG. 1A, it represents a forwarding lead of the second lens group (second component) relative to the cam barrel in the case of continuous zooming operation, but not the stepped zooming operation. A forwarding amount of the second lens group relative to the fixed barrel is, therefore, represented by a curved line 12' in FIG. 1B. In such a continuous zooming operation, the focusing operation at each zoomed point is performed by changing, with using another driving mechanism, a relative distance between the first and the second lens groups.

As shown in FIG. 1B, although the second component moves along the stepped zooming line 12, the first component moves always linearly along the zooming line 13. There have existed the following problems in such a conventional zooming/focusing lens barrel wherein one component moves along one straight line over the whole zooming area. A focal length and a view angle change generally according to the positional change of a variator lens, or according to the positional change of the second lens group in the case of the two-component zooming. On the other hand, in the single driving mechanism for both zooming and focusing operations, it is required that, during the focusing operation, a compensator lens, or focusing lens, or the first lens group in the case of the two-component zooming is moved linearly relative to a rotational angle of the lens barrel. Therefore, conventionally, during the zooming operation, the compensator lens is driven with the same lead as that used during the focusing operation, as shown in FIGS. 1A and 1B. That is, the compensator lens is driven with a constant lead over the whole zooming area. The movement of the variator lens for achieving the zooming operation is determined in compliance with the behavior (or movement) of the compensator lens. That is, as shown in FIGS. 1A and 1B, the behavior of the variator lens is determined in accordance with the lead, of the compensator lens, which is linear (namely, constant) over the whole zooming area, out of relation to an ideal focal length and a view angle. Generally, in the case of two-component zooming, the variator lens rapidly moves on a wideangle side, and gently moves on a telephoto side. The focal length and the view angle also changes in accordance therewith. That is, a user, who performs the zooming operation while looking through a view finder, feels that the focal length and the view angle change rapidly on the wideangle side and gently on the telephoto side. Thus, the user who operates the camera has a sense of incongruity or unnaturalness.

Therefore, it is an object of the present invention to provide a camera having a zoom lens barrel which is of a type of employing a single drive mechanism for performing both zooming and focusing operations, in which the variator lens is driven to move so as to realize an ideal change in focal length and view angle while the compensator lens (namely, the focusing lens) is being driven to move linearly with respect to the rotational angle of the lens barrel during the focusing operation, and in which a changing rate of the focal length and the view angle over the whole zooming area is constant to the user of the camera so that the user has a sense of less incongruity, or has a feeling of less unnaturalness.

SUMMARY OF THE INVENTION

In order to achieve the object of the present invention, according to a first aspect of the present invention, there is provided a camera comprising: a first lens group which performs focusing operation; a second lens group which moves relative to the first lens group to perform zooming operation; and a lens barrel which carries the first lens group and the second lens group, so that each of the first lens group and the second lens group can move along a zooming line including a plurality of focusing regions (focusing sections) and a plurality of zooming regions (zooming sections) in which a focusing region and a zooming region alternate with each other, wherein a feeding amount (forwarding amount) of the first lens group in one of the focusing regions is different from that of the first lens group in one of the others of the focusing regions.

The second aspect of the present invention provides a camera comprising: a first lens group which executes focusing operation; a second lens group which moves relative to the first lens group to execute zooming operation; and a lens barrel which carries the first lens group and the second lens group, so that each of the first lens group and the second lens group can move along a zooming line including a plurality of focusing regions (focusing sections) and a plurality of zooming regions (zooming sections) in which a focusing region and a zooming region alternate with each other, wherein a whole zooming area including the plurality of focusing regions and the plurality of zooming regions is divided into a plurality of zooming sub-areas, and wherein a feeding amount of the first lens group in one of the zooming sub-areas is different from that of the first lens group in one of the others of the zooming sub-areas.

In the zoom cameras provided by the first and second aspects of the present invention, the forwarding amount of the first lens group can be varied flexibly in whole zooming area, so that varying rates of the focal length and the view angle can be flexibly set.

The third aspect of the present invention provides a zoom camera comprising: a camera body; and a zoom lens barrel which is mounted on the camera body, wherein the zoom lens barrel comprises: a fixed barrel which is stationary relative to the camera body; a rotatable barrel which is connected to the fixed barrel via a helicoid and which is linearly fed relative to the fixed barrel with its rotating relative to the fixed barrel in a whole zooming area; and a plurality of lens groups that include a focusing lens group, each of which moves along a zooming line including a plurality of focusing sections and a plurality of zooming sections in which a focusing section and a zooming section alternate with each other, and that move in a direction of an optical axis relative to the rotatable barrel with their changing relative position when the rotatable barrel is forwarded, wherein, in each of the focusing sections, the focusing lens group is linearly fed relative to a rotational angle of the rotatable barrel, wherein the whole zooming area including the focusing sections and the zooming sections is divided into a wideangle-side zooming sub-area and a telephoto-side zooming sub-area, wherein, in the focusing sections which belong to one of the wideangle-side zooming sub-area and the telephoto-side zooming sub-area, the forwarding amounts of the focusing lens group relative to the rotational angle of the rotatable barrel in the focusing sections are equal to each other, and the forwarding amounts of the focusing lens group relative to the rotational angle of the rotatable barrel in the wideangle-side zooming sub-area and in the telephoto-side zooming sub-area are different from each other, wherein, in the wideangle-side zooming sub-area, the focusing lens group does not move relative to the rotatable barrel, and wherein, in the telephoto-side zooming sub-area, a helicoid formed on a carrying frame for the focusing lens group and a helicoid formed on the rotational barrel cooperates with each other, so that the focusing lens group is linearly fed relative to the rotational barrel.

In the zoom cameras provided by the third aspect of the present invention, the "forwarding amount of the focusing lens group in the telephoto side zooming sub-area" can be made larger than that in the wideangle side zooming sub-area, so that the varying rates of the focal length and the view angle can be made linear in view of the user's feelings in whole zooming area.

BRIEF DESCRIPTION OF THE DRAWINGS

This and other objects and features of the present invention will become apparent from the following description taken in conjunction with the preferred embodiments thereof with reference to the accompanying drawings, in which.

DETAILED DESCRIPTION OF THE PREFERRED EMBODIMENTS

Figure 1A:
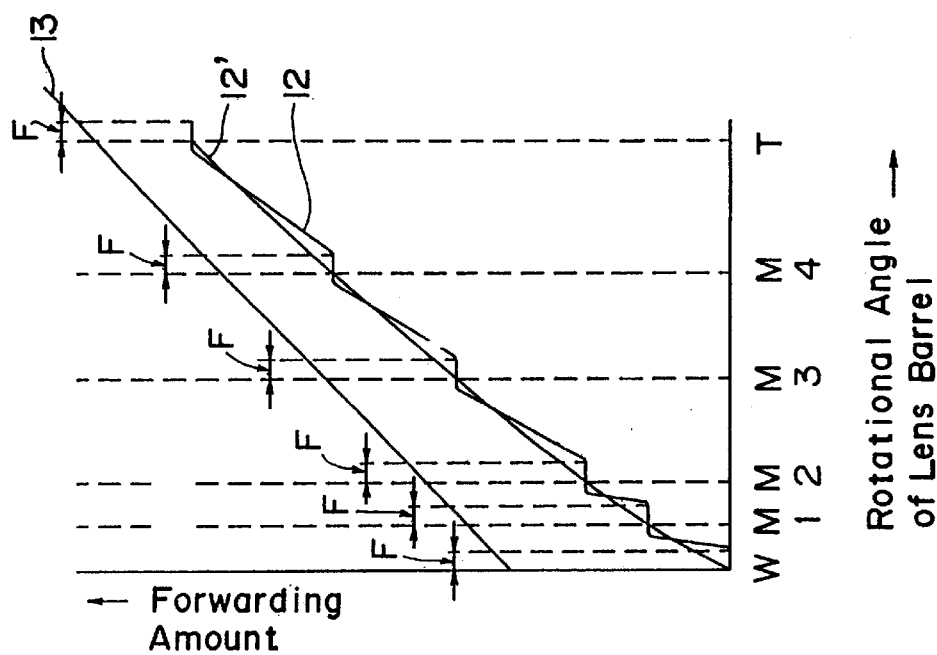
FIGS. 1A and 1B, respectively, show a zooming line of a camera which employs a single mechanism for both zooming and focusing operations wherein the focusing operation is performed with a first lens group and the zooming operation is performed with a second lens group.

Before the description of the embodiments proceeds, it is to be noted that like or corresponding parts are designed by like reference numerals throughout the accompanying drawings.

Figure 6:
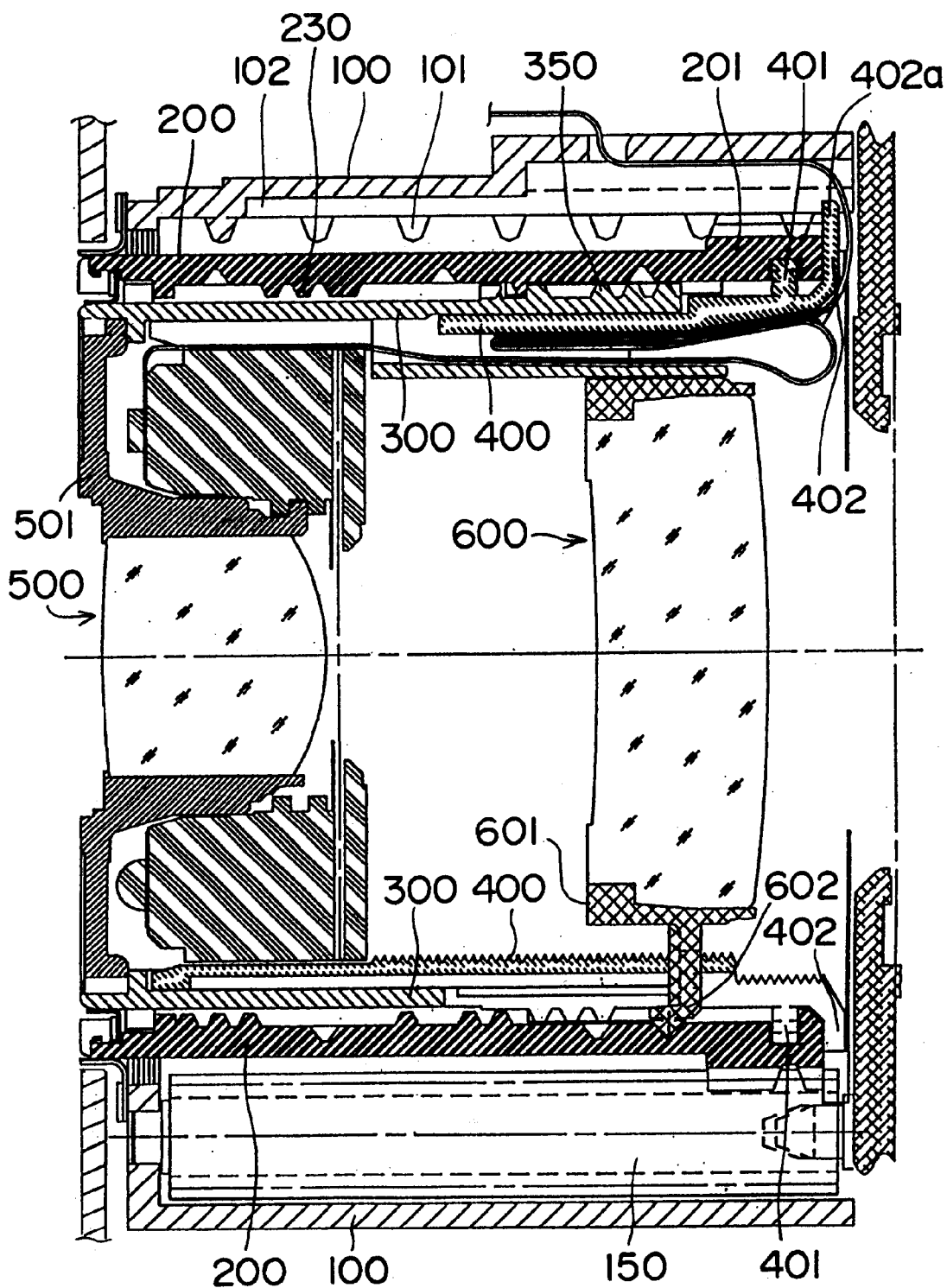
FIG. 6 is a cross-sectional view of a zoom lens barrel in a collapsed-position of the camera according to the embodiment.
Figure 9:
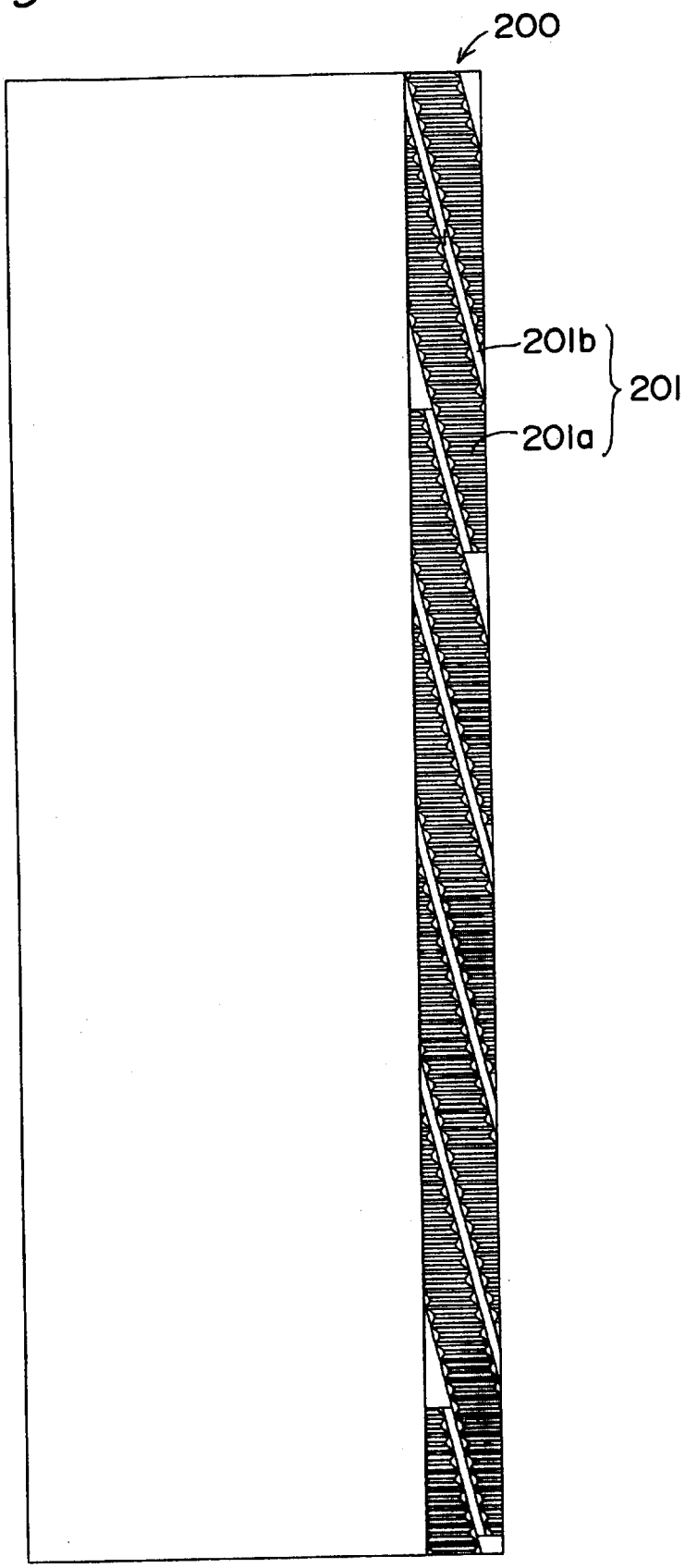
FIG. 9 is a development elevation view showing a geometry of an outer surface of a cam barrel in the zoom lens barrel of FIG. 6.

A first embodiment of the present invention is described below with reference to attached drawings. FIG. 6 shows a cross section of a lens barrel which is in a collapsed-position. A fixed barrel 100 is fixed to a camera body so as not to be immobilized or stationary, and a cam barrel (rotatable barrel) 200 is accommodated in the fixed barrel 100. As understood from FIG. 9, where an outer surface of the cam barrel 200 is shown, the cam barrel 200 has a helicoid gear 201 at its proximal end. The helicoid gear 201 comprises a belt-like gear 201a which is formed over the whole circumference of the cam barrel 200, and a female-helicoid 201b which is formed so as to diagonally cross the belt-like gear 201a. Driving force is transmitted from a driver gear 150 to the belt-like gear 201a of the cam barrel 200, so that the cam barrel 200 rotates inside the fixed barrel 100.

The female-helicoid 201b is engaged with a male-helicoid 101 which is formed on an inner surface of the fixed barrel 100. Therefore, when the cam barrel 200 rotates inside the fixed barrel 100, the cam barrel 200 is forwardly sent relative to the fixed barrel 100 (namely, relative to the camera body). Then the cam barrel 200 reaches a telephoto-position (or telescopic-position) shown in FIG. 8 via a wideangle-position shown in FIG. 7. The cam barrel 200 advances and retreats in a direction of optical axis along the fixed barrel. The entire length of the driver gear 150 is made generally equal to that of the fixed barrel 100, so that the driving force can be transmitted to the belt-like gear 201a, no matter which position the cam barrel 200 may locates relative to the fixed barrel 100. Since the male-helicoid 101 is formed with a regular lead angle over the whole zooming area, the forwarding amount of the cam barrel 200 becomes linear to its rotation angle (refer to FIG. 2A).

Figure 7:
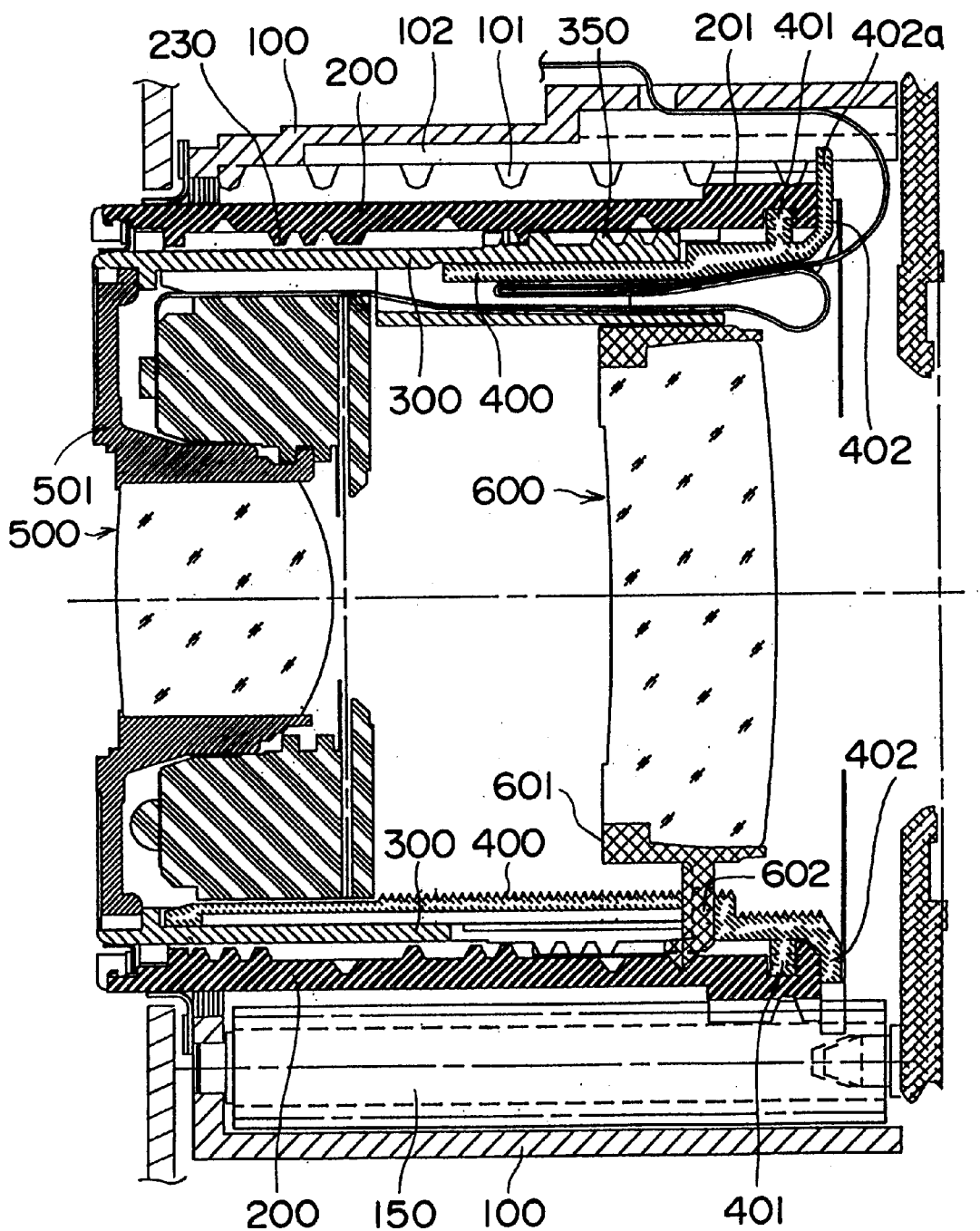
FIG. 7 is a cross-sectional view of the zoom lens barrel in a wideangle-position of FIG. 6.
Figure 8:
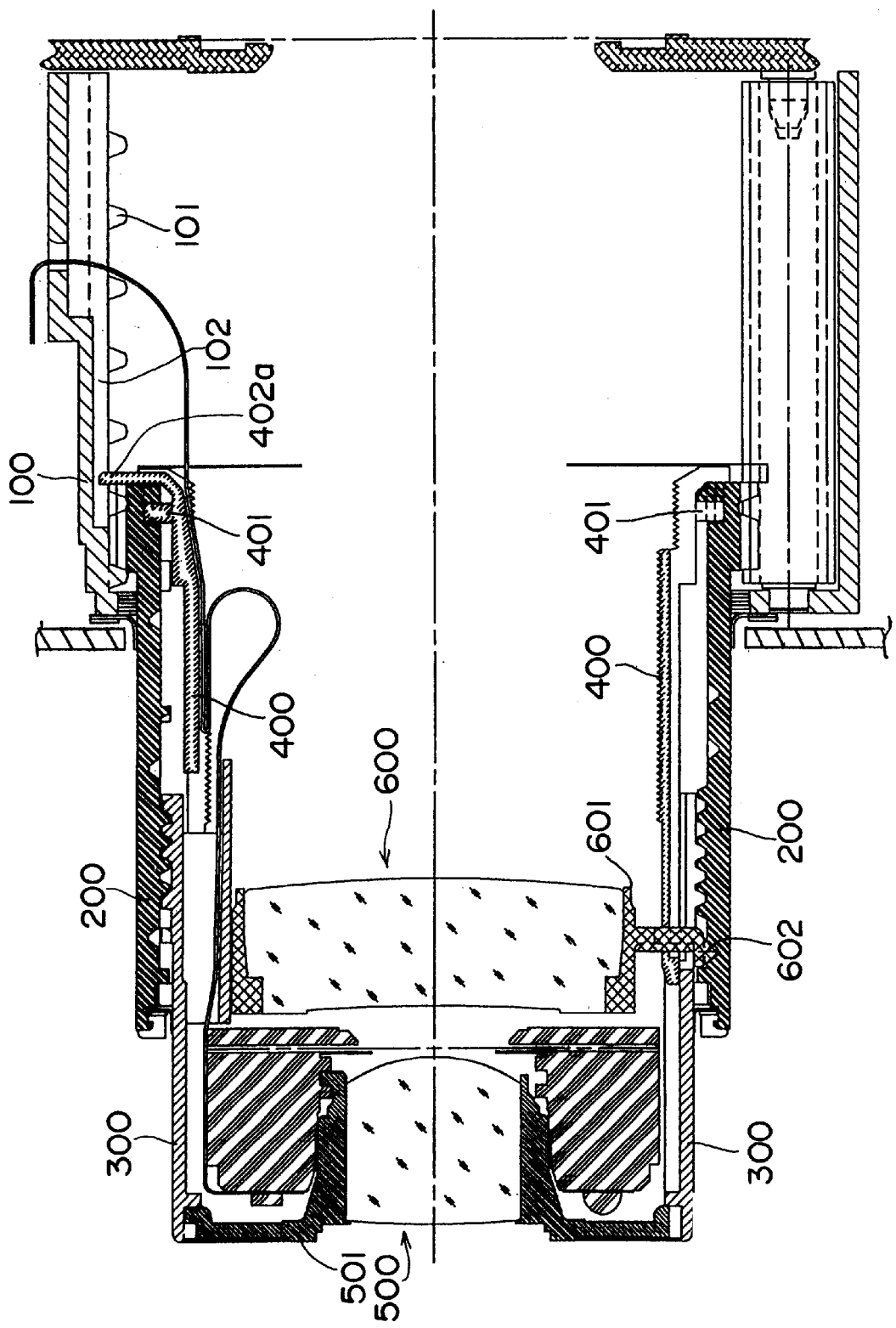
FIG. 8 is a cross-sectional view of the zoom lens barrel in a telephoto-position (telescopic-position) of FIG. 6.

As shown in FIGS. 6 to 8, within the cam barrel 200, there are accommodated an advance barrel 300 and a straight guide barrel 400, which are combined with each other. The straight guide barrel 400 is connected to the cam barrel 200 with a bayonet engagement portion 401, such that the straight guide barrel 400 can relatively rotates to the cam barrel 200 but can not relatively move to the same in the direction of optical axis. The straight guide barrel 400 has a flange 402 at its proximal end, and a portion 402a of the flange 402 is projected radially to be engaged within a straight guide groove 102 which is formed on the inner surface of the fixed barrel 100. As a result, relative to the fixed barrel 100, the straight guide barrel 400 can not rotates but can move in the direction of optical axis.

Therefore, when the cam barrel 200 rotates inside the fixed barrel 100, the straight guide barrel 400 advances and retreats in the direction of optical axis with the cam barrel 200. In these movements, the straight guide barrel 400 rotates relative to the cam barrel 200 but does not rotate relative to the fixed barrel 100. Although, in FIGS. 6 to 8, only one straight guide groove 102 and only one projected flange portion 402a are respectively shown, actually they are formed plural along their circumferential direction.

Relatively to the straight guide barrel 400, the advance barrel 300 can advance and retreat in the direction of optical axis but can not rotates. That is, because the straight guide barrel 400 can not rotate relative to the fixed barrel 100, the advance barrel 300 also can not rotates relative to the fixed barrel 100. On the other hand, on the outer surface of the advance barrel 300, a helicoid 350 (see FIG. 11) described later is formed, and the helicoid 350 is engaged with a helicoid 230, also described after, formed on the inner surface of the cam barrel 200. Therefore, when the cam barrel 200 rotates inside the fixed barrel 100, the advance barrel 300 advances and retreats a predetermined distance in the direction of optical axis relative to the cam barrel 200, with its being guided by the straight guide barrel 400 due to an interaction between the helicoids 230 and 350. The movement amount of the advance barrel 300 relative to the fixed barrel 100 is represented by a sum of "movement amount of the cam barrel 200 relative to the fixed barrel 100 in the direction of optical axis" and "movement amount of the advance barrel 300 relative to the cam barrel 200 in the direction of optical axis". Since, as shown in FIGS. 6 to 8, the advance barrel 300 carries a first lens group 500 integrally formed thereto through a carrying frame 501 (a carrying frame for a focusing lens group), the behavior of the advance barrel 300 itself is the behavior of the first lens group 500. The interaction between "the helicoid 230 formed on the inner surface of the cam barrel 200" and "the helicoid 350 formed on the outer surface of the advance barrel 300" is described below with reference to FIGS. 10 to 14.

Figure 10:
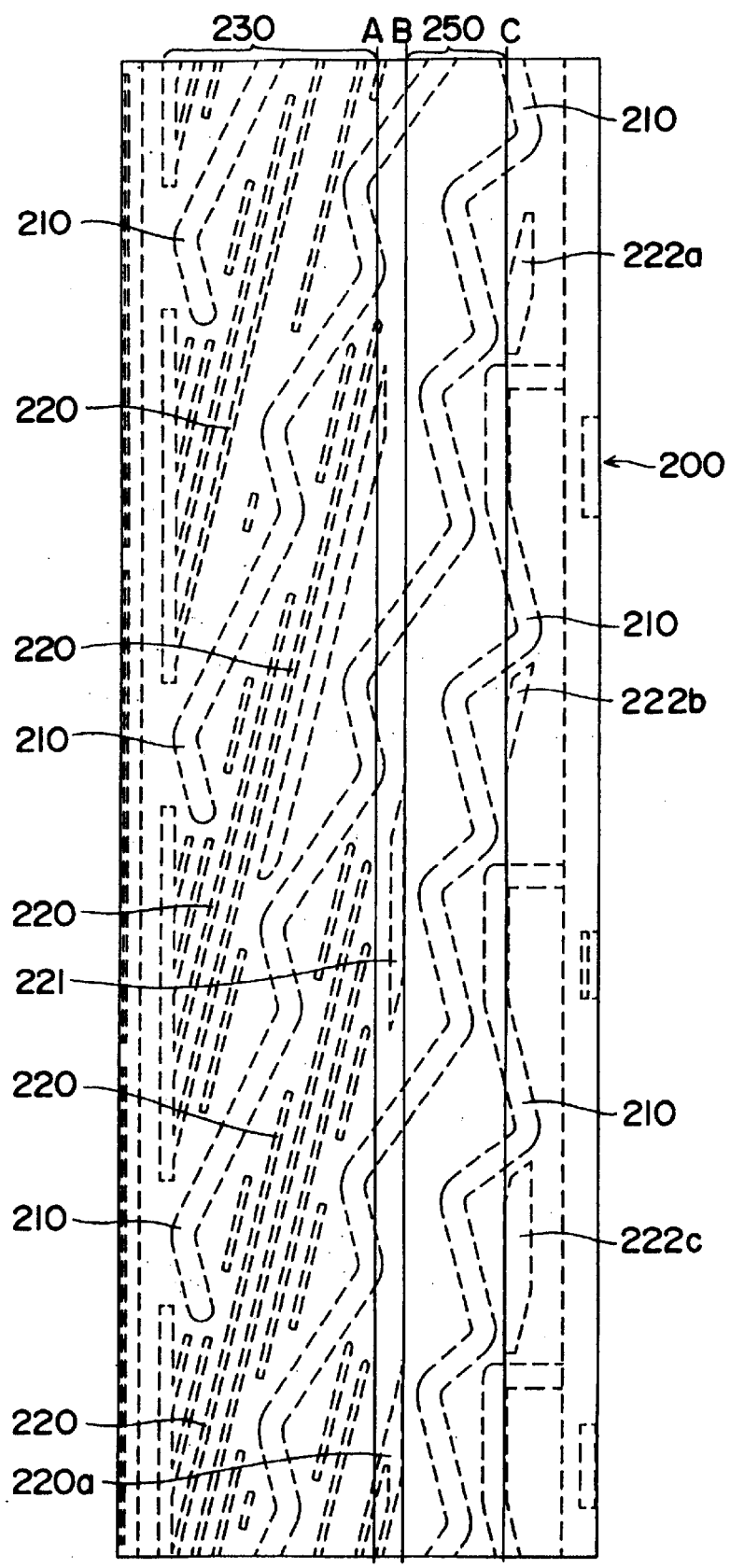
FIG. 10 is a development elevation view showing a geometry of an inner surface of the cam barrel of FIG. 9.

FIG. 10 is a development elevation view which shows a geometry (or arrangement) of the inner surface of the cam barrel 200. Note that FIG. 10 shows the inner surface from the outer surface side; therefore, cam grooves 210 and a helicoid 230, both formed on the inner surface thereof, are all represented by dashed lines. The stepped cam grooves 210 are recessed ones formed on the inner surface of the cam barrel 200, and receives follower pins 602 which are formed on a frame 601 of a second lens group 600. Three cam grooves 210 are formed with a regular interval between adjacent cam grooves 210 in a circumferential direction of the cam barrel 200.

On the inner surface of the cam barrel 200, there are formed a plurality of ridges 220 which extend straightly and diagonally relative to the optical axis. Since there are many ridges, the reference numerals are not assigned to all the ridges. The ridges 220 extend in parallel to each other, and they are partially broken to avoid the stepped cam grooves 210. Because FIG. 10 is the development elevation view, each of the ridges 220 is straight. But, actually, the ridges 220 spirally extend on the inner surface of the cylindrical cam barrel 200, and they constitute the helicoid 230.

Generally, the ridges 220 constituting the helicoid 230 proximally extend to reach a line "A" in FIG. 10. But, a ridge 220a further extends a little bit more proximally to reach a line "B" in FIG. 10.

Further, on the inner surface of the cam barrel 200, as shown in FIG. 10, there is formed a land 221 which is upheaved and elongated. The land 221 extends in the circumferential direction of the cam barrel 200 along the line "B". On the other hand, along a line "C" which is located at more proximal position, three upheaved lands 222a to 222c are formed. That is, the ridge 220a and the upheaved lands 221, 222a to 222c constitute a belt-like region 250 (namely, the region between the lines "B" and "C" in FIG. 10) on the inner surface of the cam barrel 200 which extends in the circumferential direction of the cam barrel 200. This belt-like region 250 is a recessed region existing between the upheaved portions.

Figure 11:
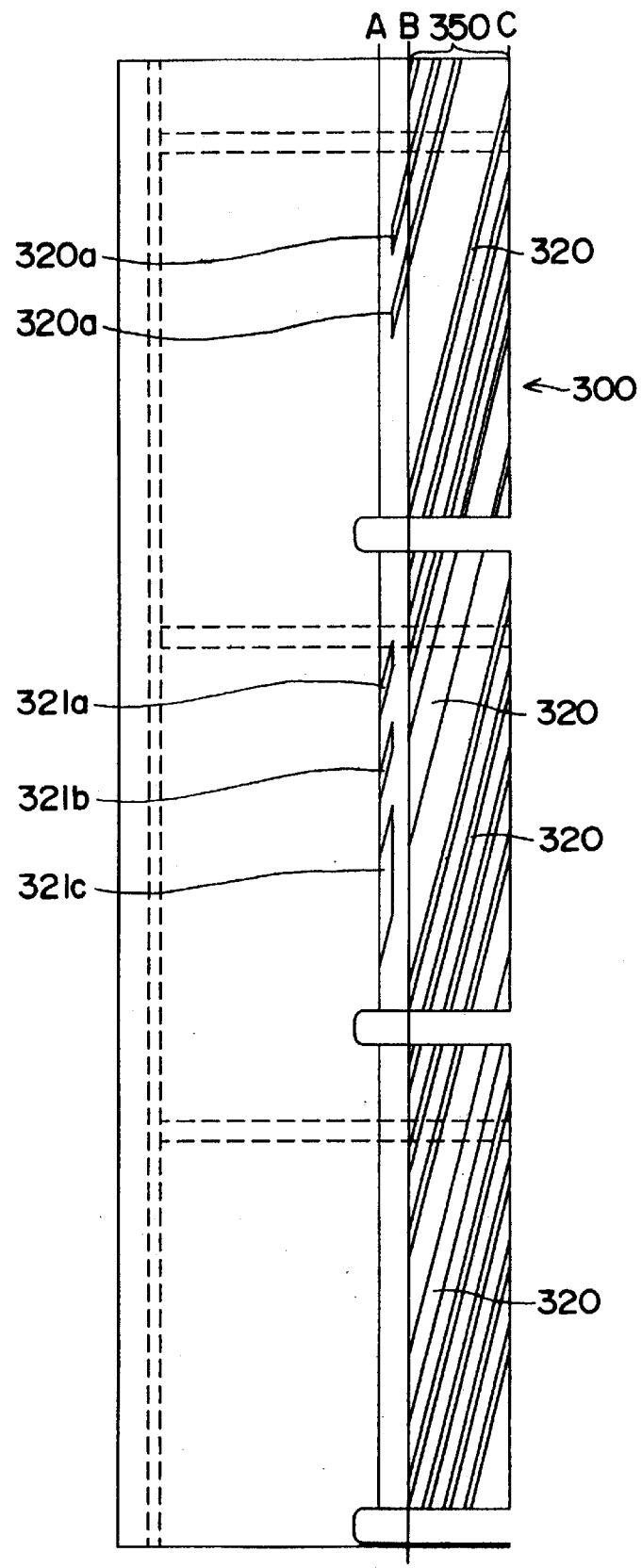
FIG. 11 is a development elevation view showing a geometry of an outer surface of an advance barrel in the zoom lens barrel of FIG. 6.

FIG. 11 is a development elevation view which shows an outer surface of the advance barrel 300. On the outer surface of the advance barrel 300, there are formed a plurality of ridges 320 which extend straightly and diagonally relative to the optical axis. Since there are many ridges, the reference numerals are not assigned to all the ridges. The ridges 320 extend in parallel to each other. Because FIG. 11 is the development elevation view, each of the ridges 320 is straight. But, actually, the ridges 320 spirally extend on the outer surface of the cylindrical advance barrel 300.

Generally, the ridges 320 constituting the helicoid 350 distally extend from a line "C" at the proximal end to a line "B" in FIG. 11. But, ridges 320a further extend a little bit more distally. The region between the lines "B" and "C" constitute a belt-like helicoid 350 which extends in the circumferential direction of the advance barrel 300. This belt-like helicoid 350 is wholly upheaved. Further, as shown in FIG. 11, at further distal position on the outer surface of the advance barrel 300, there are formed three upheaved lands 321a to 321c which extend along a line "A" in the circumferential direction of the advance barrel 300. The function of these lands 321a to 321c will be explained below.

Figure 12:
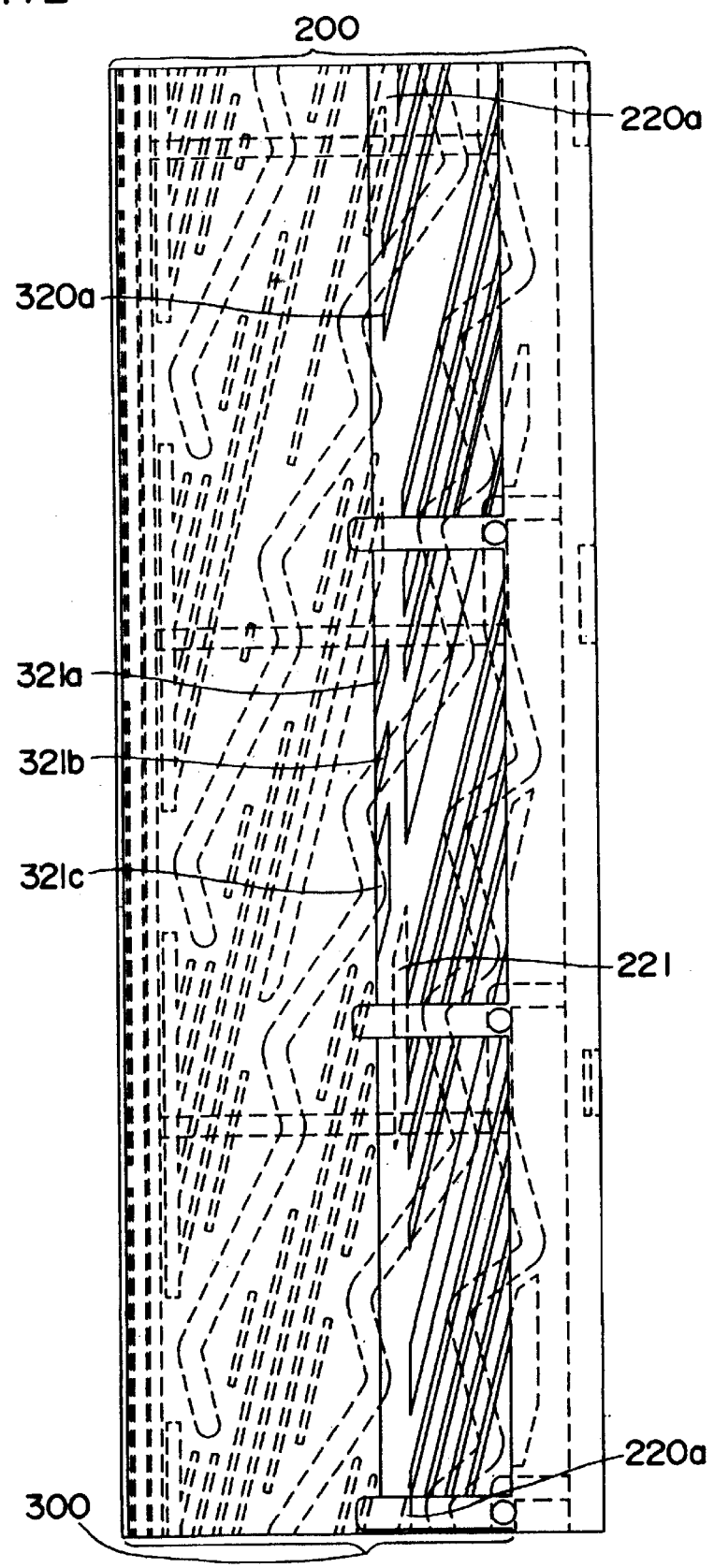
FIGS. 12 to 14, respectively, show the cam barrel of FIG. 9 and the advance barrel of FIG. 11 in their overlapped relationship, which explains their mutual cooperation.
Figure 13:
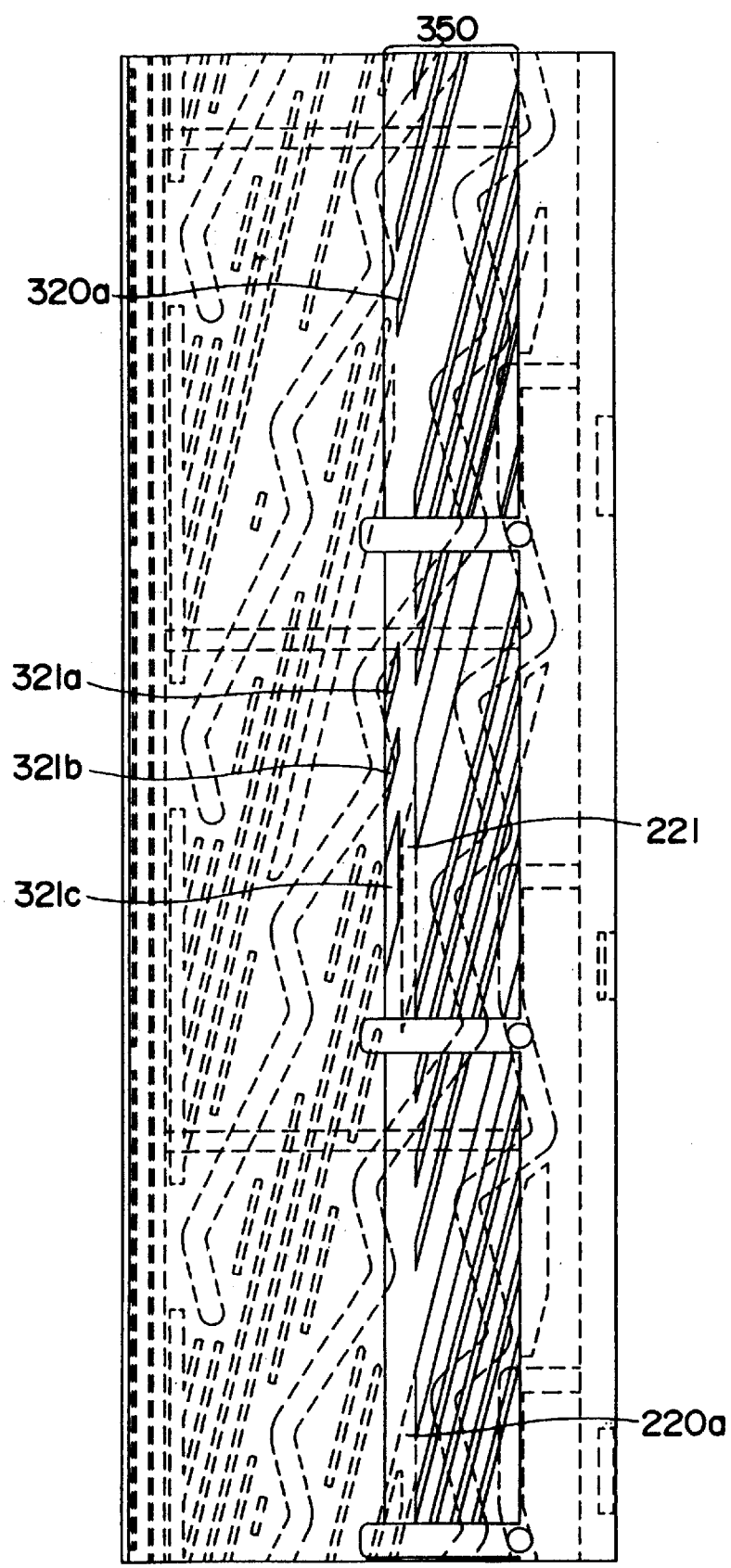
Figure 14:
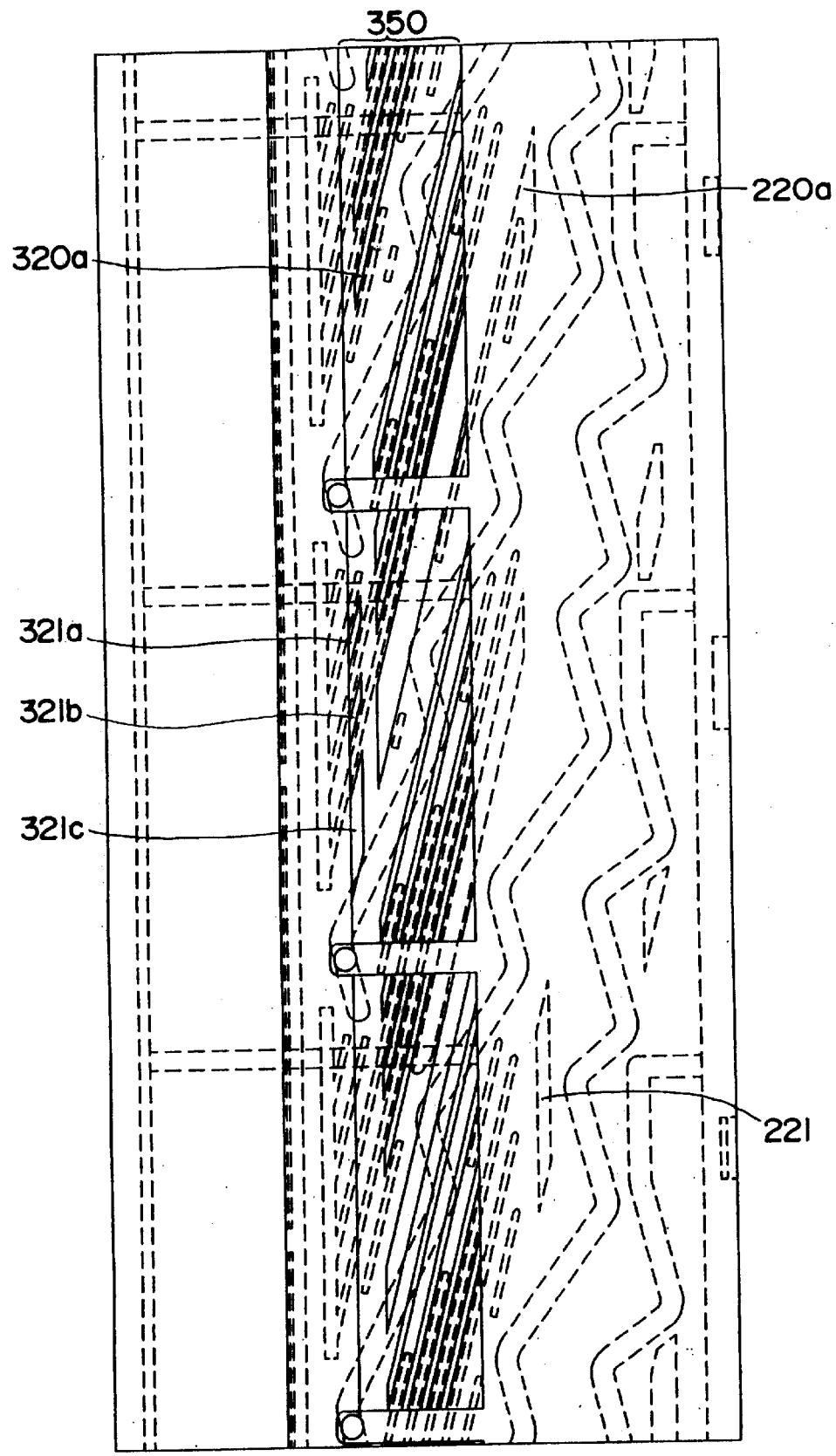

FIGS. 12 to 14 are, respectively, a development elevation wherein the cam barrel 200 and the advance barrel 300 are overlapped. In order to keep consistency with FIGS. 10 and 11, the geometry of the inner surface of the cam barrel 200 is shown with broken lines and the geometry of the outer surface of the advance barrel 300 is shown with solid lines. But, because the advance barrel 300 relatively rotates inside the cam barrel 200, the cam barrel 200 locates at this side of paper and the advance barrel 300 locates at further side of paper in FIGS. 12 to 14. FIG. 12 shows a positional relationship between the cam barrel 200 and the advance barrel 300 in the collapsed-position (corresponding to FIG. 6), FIG. 13 shows the same in the wideangle-position (corresponding to FIG. 7), and FIG. 14 show the same in the telephoto-position (corresponding to FIG. 8).

As explained before, it is only the cam barrel 200 which rotates relative to the fixed barrel 100. The straight guide barrel 400 and the advance barrel 300 can not rotate relative to the fixed barrel 100. That is, when the cam barrel 200 rotates relatively inside the fixed barrel 100, the cam barrel 200 is to rotate also relative to the advance barrel 300 located therein. Therefore, when the cam barrel 200 rotates from the collapsed-position to the wideangle-position, the cam barrel 200 and the advance barrel 300 relatively rotate with each other so that the development elevation of the cam barrel 200 moves upwards and the development elevation of the advance barrel 300 moves downwards in FIG. 12.

During the transition from the collapsed-position in FIG. 12 to the wideangle-position in FIG. 13 as above, the upheaved belt-like helicoid 350 formed on the outer surface of the advance barrel 300 pass through, in the circumferential direction (in the development elevation in FIGS. 12 to 14, in the downward direction), the recessed belt-like region 250 formed on the inner surface of the cam barrel 200. In this movement, since there is no obstruction against the advance of the projecting extension 320a and the land 321c, the cam barrel 200 and the advance barrel 300 only rotate relatively to each other without changing their relative position in the direction of optical axis. However, the cam barrel 200 is forwardly sent, or fed, relative to the fixed barrel 100 with its rotating. As a result, the advance barrel 300 is also forwardly sent, or fed, relative to the fixed barrel 100.

During the transition from the wideangle-position in FIG. 13 to the telephoto-position in FIG. 14, until the advance barrel reaches a certain position on the way to the telephoto-position, there is no obstruction against the advancement of the projecting extension 320a and the land 321c. Therefore, the cam barrel 200 and the advance barrel 300 relatively rotate to each other without changing their relative position in the direction of optical axis, as during the transition from the collapsed-position to the wideangle-position. However, in a while, the projecting extension 320a strikes the land 221, and the land 321c strikes the projecting extension 220a, respectively. As a result, the helicoid 230 on the inner surface of the cam barrel 200 and the helicoid on the outer surface of the advance barrel 300 are engaged with each other (hereinafter, this relative position of the cam barrel and the advance barrel is referred to as a "turning point"). When the cam barrel 200 and the advance barrel 300 further rotates relatively to each other after passing through the turning point, they starts to relatively move also in the direction of optical axis. The advance barrel 300 is forwardly sent relative to the cam barrel 200 with a linear lead relative to the rotational angle of the cam barrel 200. Finally, the cam barrel 200 reaches the telephoto-position in FIG. 14.

As understood from the above explanation, during the transition from the turning point to the telephoto-position, when the cam barrel 200 rotates, the cam barrel 200 itself is forwardly sent with a linear lead ("first lead") relative to the fixed barrel 100, and the advance barrel 300 is also forwardly sent with a linear lead ("second lead") relative to the cam barrel 200. Therefore, relative to the fixed barrel 100, the advance barrel 300 is forwardly sent with a lead which corresponds to the sum of the first lead and the second lead. This corresponds to a "zooming sub-area on telephoto-side" which locates on the right side relative to the crooked point "A" in FIG. 2A, as described later.

On the other hand, during the transition from the collapsed-position via the wideangle-position to the turning point, when the cam barrel 200 rotates, the cam barrel 200 itself is forwardly sent with a linear lead (first lead) relative to the fixed barrel 100, but the advance barrel 300 does not move relative to the cam barrel 200 in the direction of optical axis. As a result, relative to the fixed barrel 100, the advance barrel 300 is forwardly sent only with the first lead, like the cam barrel 200. This corresponds to a "zooming sub-area on wideangle-side" which locates on the left side relative to the crooked point "A" in FIG. 2A, as described later.

Figure 1B:
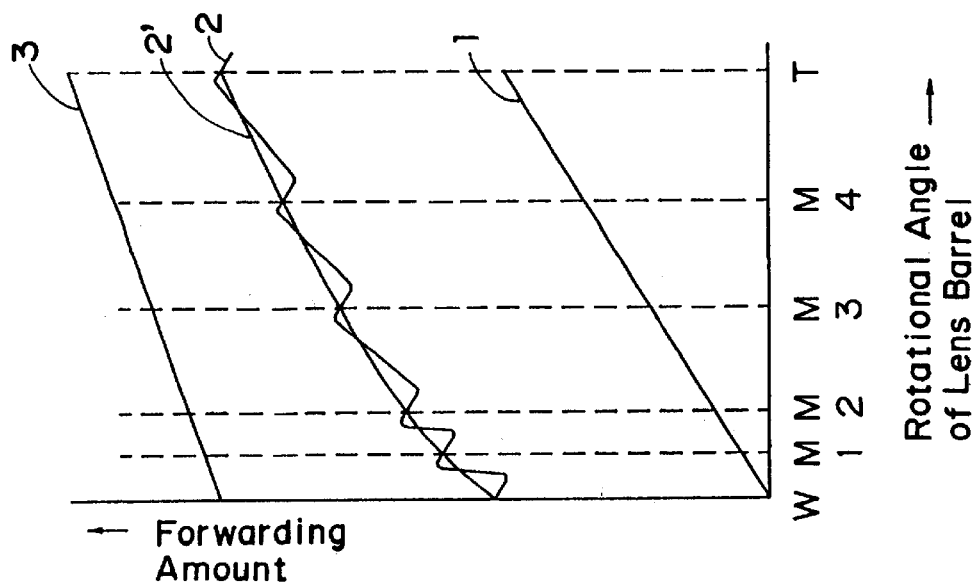
Figure 2A:
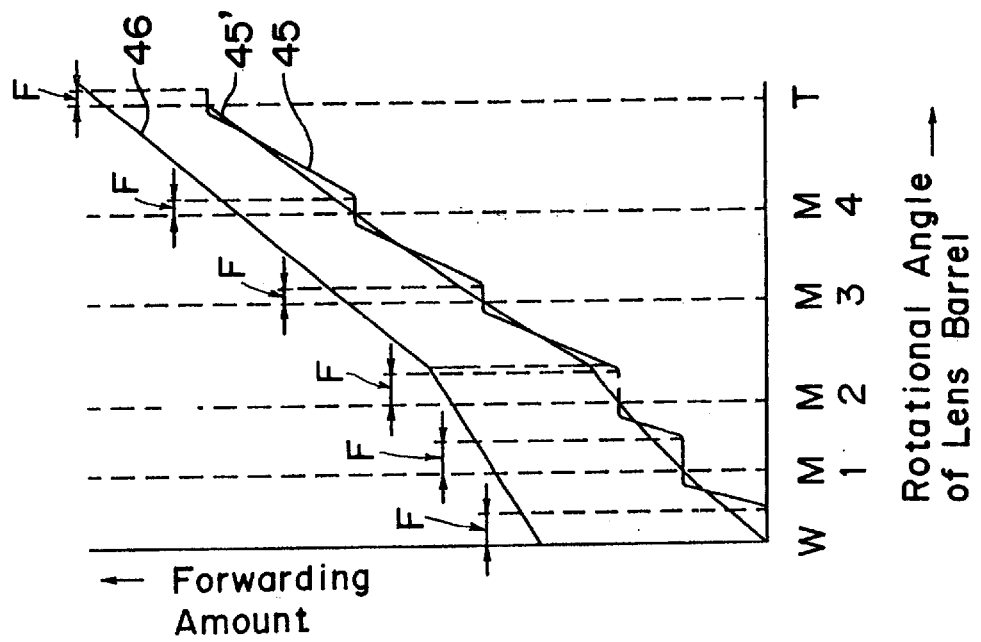
FIGS. 2A and 2B, respectively, show a zooming line of a zoom camera according to a first embodiment of the present invention.
Figure 2B:
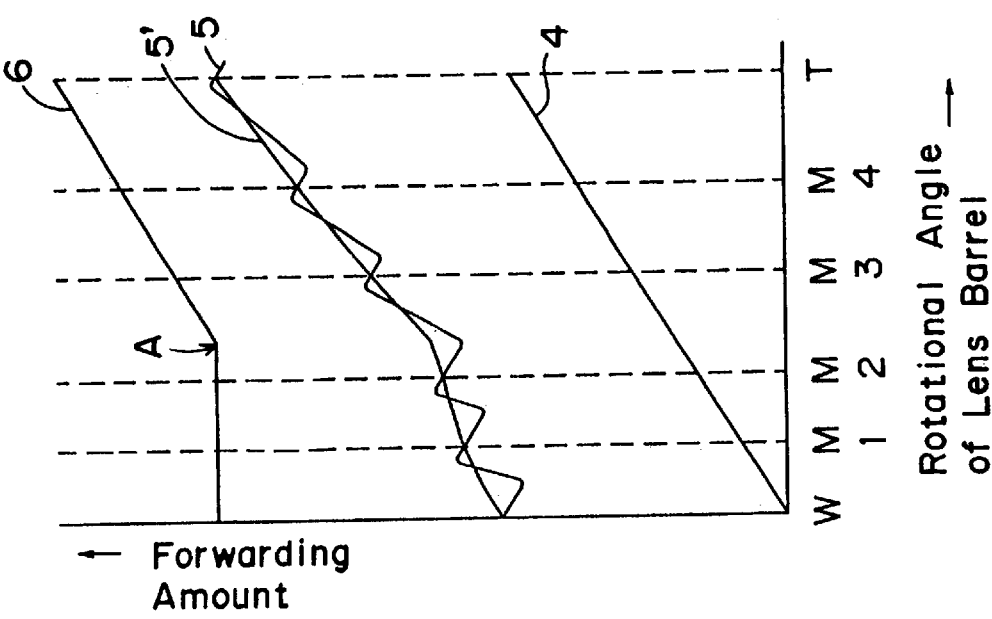

The aforementioned facts are clearly shown in FIGS. 2A and 2B. FIGS. 2A and 2B show the zooming line in the above-mentioned camera, and correspond to that of the conventional camera described with reference to FIGS. 1A and 1B. A straight line 4 in FIG. 2A represents a forwarding lead of the cam barrel 200 relative to the fixed barrel 100. It can be understood that forwarding amount of the cam barrel 200 relative to the fixed barrel 100 is linear over the whole zooming area.

On the other hand, a crooked line 6 represents a forwarding lead of the advance barrel 300 relative to the cam barrel 200 (namely, forwarding lead of the first lens group 500 ("first component")), and the crooked point "A" corresponds to the above-mentioned turning point. That is, in the first embodiment, the whole zooming area is divided into two sub-areas, one of which is "zooming sub-area on wideangle-side" which locates at the left side relative to the crooked point "A", and the other of which is "zooming sub-area on telephoto-side" which locates at the right side relative to the crooked point "A". At the "zooming sub-area on wideangle-side" which extends from the wideangle-position to the turning point, the crooked line 6 is parallel (namely, horizontal in the figure); therefore, the first lens group 500 is not sent relative to the cam barrel 200. However, passing through the turning point (crooked point "A") into the "zooming sub-area on telephoto-side", the first lens group 500 starts to be sent relative to the cam barrel 200 with the linear lead. At this stage, the forwarding lead of the first lens group 500 relative to the fixed barrel 100 is represented by an addition, or a sum, of the straight line 4 and the crooked line 6, which is represented by a crooked line 46 in FIG. 2B. In this embodiment, in both the "zooming sub-area on wideangle-side" and the "zooming sub-area on telephoto-side", respectively, there exist three focusing sections, each of which corresponds to different focal length. It can be understood that the forwarding amounts in the focusing sections belonging to the same zooming sub-area are all equal to each other.

A stepped line 5 corresponds to the stepped cam groove 210 formed on the inner surface of the cam barrel 200. That is, the stepped line 5 represents a forwarding lead of the second lens group 600 ("second component") relative to the cam barrel 200. Therefore, a forwarding amount of the second lens group 600 relative to the fixed barrel 100 is represented by an addition, or a sum, of the straight line 4 and the stepped line 5, which is represented by a stepped line 45 in FIG. 2B. As to stepped lines 5' and 45', they represent zooming lines in the case of continuous zooming operation like in FIGS. 1A and 1B. In the embodiment shown in FIGS. 2A and 2B, the variation of the focal length relative to the rotational angle is shown by a line "L1" in FIG. 3, because it corresponds to the movement of the second component. Because the available focal lengths are scattered, which are represented by dotted points in FIG. 3, a view finder is only required to move along a line "L2" which joins the dotted points. Thus, the view variation through the view finder can be made more smooth.

In comparing FIG. 1B and FIG. 2B, there is no substantial difference between the forwarding amounts of the second components (variator) which perform the zooming operation. But, there is a difference between the forwarding amounts of the first components (compensator) which perform the focusing operation. That is, although the conventional first component advances and retreats linearly with a constant forwarding amount over the whole zooming area, the forwarding amount of the first component of the zoom camera according to the embodiment changes before and after the crooked point "A". Thanks to this change, it is possible to make a varying rate (or changing rate), of focal length and view angle, larger on the telephoto-side than the conventional varying rate on the same side, because the first component (compensator) is driven with at least two leads, of a small lead on the wideangle-side and a large lead on the telephoto-side, rather than a regular lead over the whole zooming area, so that the second component (variator) is prevented from rapidly moving (or changing) on the wideangle-side and from gently moving (or changing) on the telephoto-side. Thus, the user performing the zooming operation while looking into the view finder has less unnatural feeling than she/he has at time of performing the conventional zooming operation.

Figure 4:
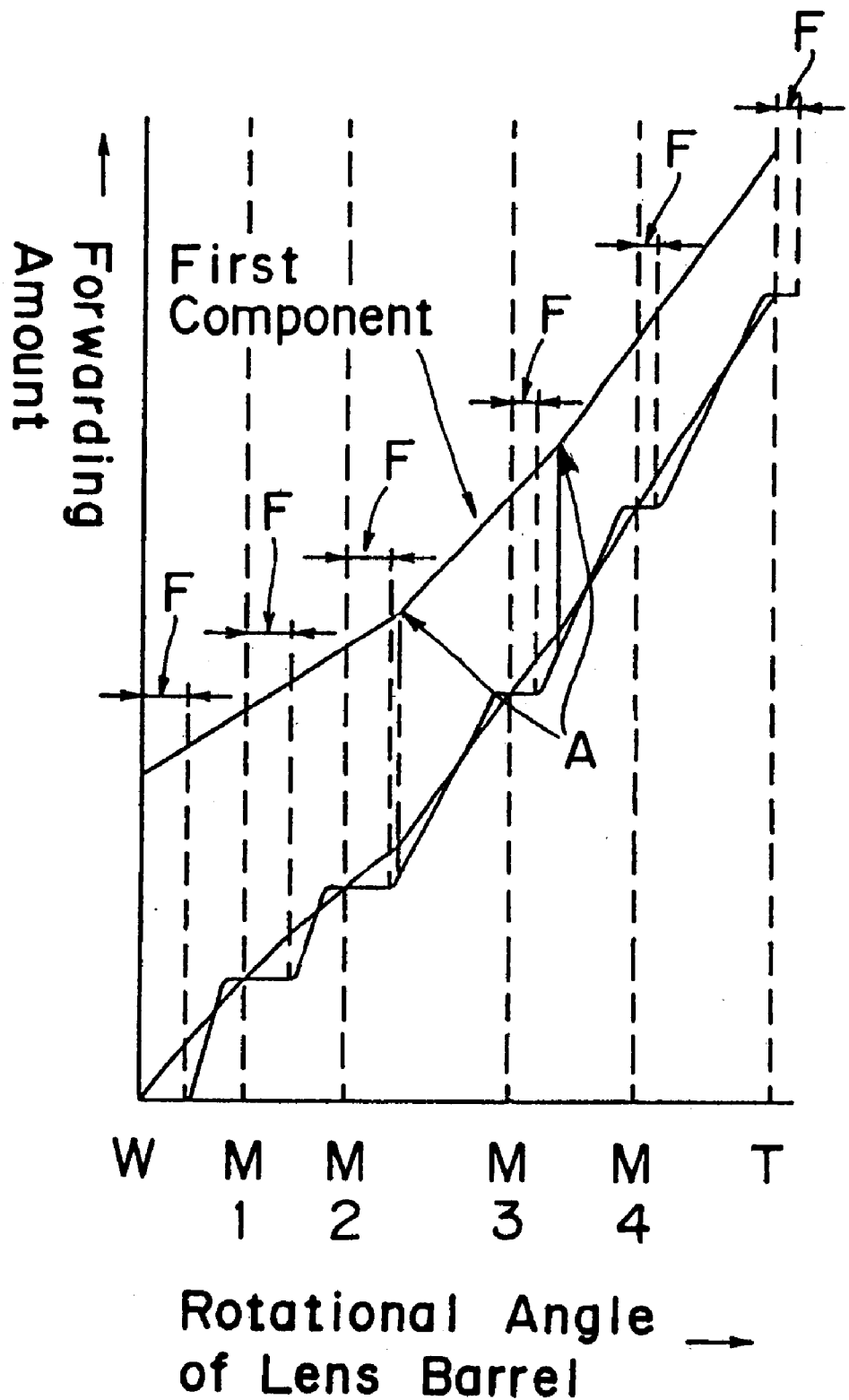
FIG. 4 shows a zooming line of the zoom camera according to a second embodiment of the present invention.

The larger the number of the crooked points "A" becomes (that is, the more sub-areas the whole zooming area is divided into), the larger the above-mentioned benefits become. For example, in order to provide two crooked points "A" as above-mentioned, the geometry of each helicoid formed on the inner surface of the cam barrel 200 and formed on the outer surface of the advance barrel 300 is changed so that two turning points as above-mentioned are provided. It is also true of the case that three or more crooked points "A" as above-mentioned are provided. FIG. 4 shows a zooming line of a second embodiment of the present invention wherein two turning points are provided, and corresponds to FIGS. 1B and 2B. It can be understood that two crooked points "A" exist accordingly to the existence of two turning points, and therefore the whole zooming area is divided into three zooming sub-areas.

Figure 3:
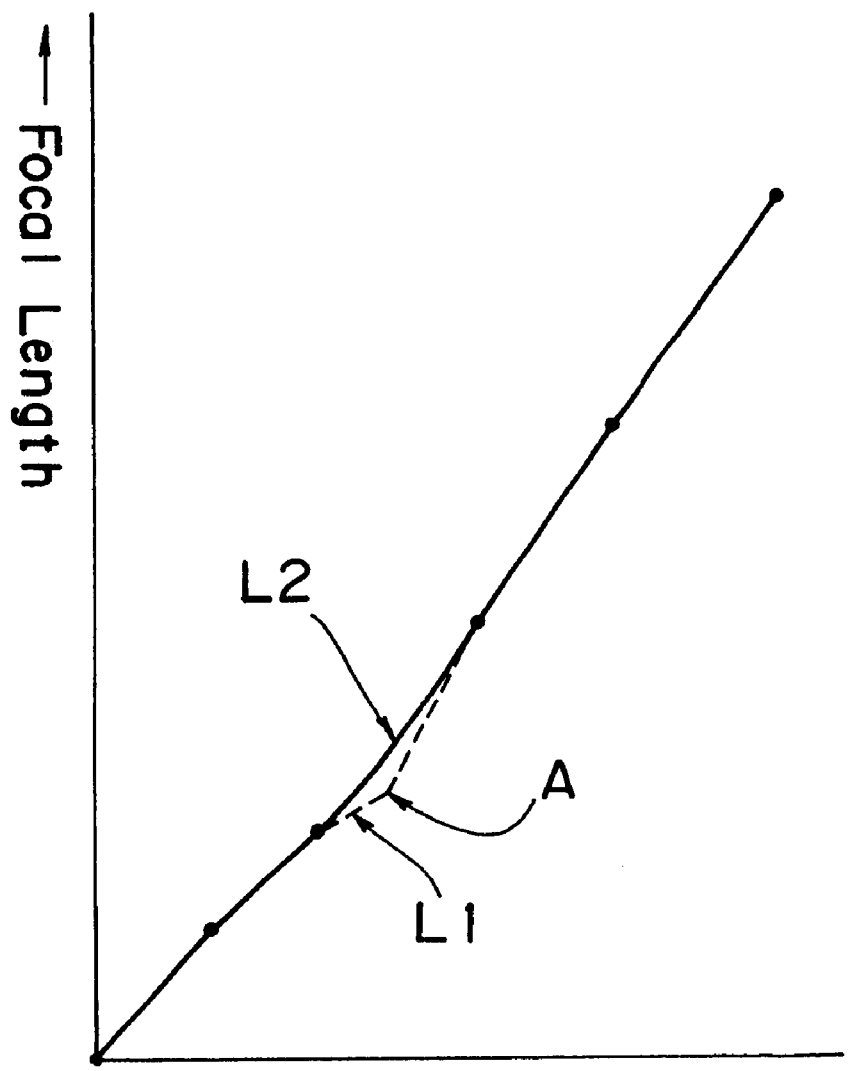
FIG. 3 is a diagram showing a behavior (or movement) of each lens of the zoom camera shown in FIGS. 1A and 1B.
Figure 5B:
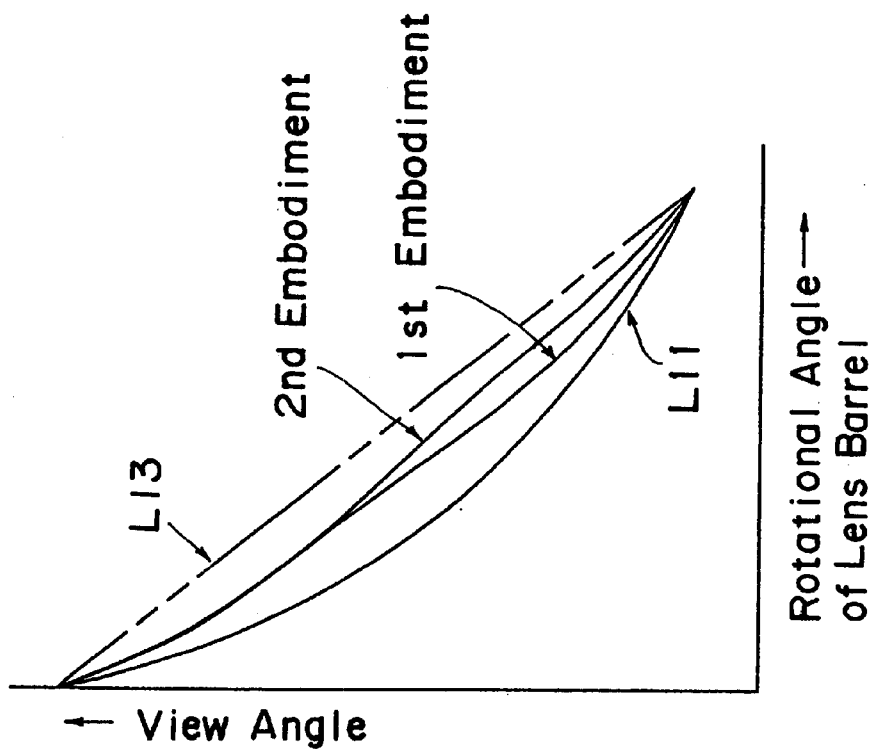
FIGS. 5A and 5B are, respectively, a diagram showing that the varying rates (changing rate) of the focal length and the view angle become more linear, thanks to the present invention.
Figure 5A:
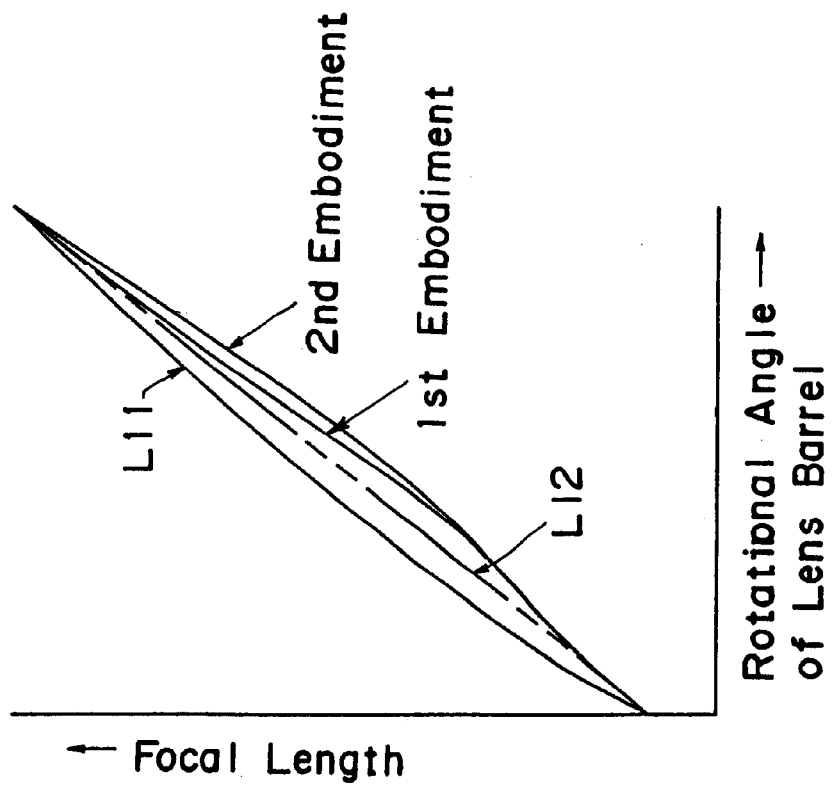

In the embodiments shown in FIGS. 2 to 4, the forwarding amount of the advance barrel 300 relative to the fixed barrel 100 becomes larger as the zooming sub-area goes from the wideangle-side to the telephoto-side. This constitution is intended to make the varying rates of the focal length and the view angle approach to being linear as much as possible in view of the user's feelings over the whole zooming area. The effect resulting from such a constitution is shown in FIGS. 5A and 5B. FIG. 5A shows the varying rate of the focal length relative to the rotational angle of the lens barrel. FIG. 5B shows the varying rate of the view angle relative to the rotational angle of the lens barrel. In FIGS. 5A and 5B, lines "L11", respectively, represent conventional variations of focal length and view angle in the case the first component moves linearly relative to the rotational angle of the zoom lens barrel. A line "L12" represents an ideal variation of focal length wherein the focal length linearly varies relative to the rotational angle of the zoom lens barrel. A line "L13" represents an ideal variation of view angle wherein the view angle linearly varies relative to the rotational angle of the zoom lens barrel. It can be understood that each varying rate is more linear (or ideal) in the second embodiment wherein two crooked points exist, than the first embodiment wherein one crooked point exists.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A camera comprising:

a first lens group which performs focusing operation;

a second lens group which moves relative to the first lens group to perform zooming operation; and a lens barrel which carries the first lens group and the second lens group, so that each of the first lens group and the second lens group can move along a zooming line including a plurality of focusing regions and a plurality of zooming regions in which a focusing region and a zooming region alternate with each other, wherein a feeding amount of the first lens group in one of the focusing regions is different from that of the first lens group in one of the others of the focusing regions.

2. The camera of claim 1, wherein the lens barrel comprising:

a stationary barrel which is stationary relative to a body of the camera; and a rotatable barrel which can rotate relative to the stationary barrel, wherein the first lens group is fed linearly relative to a rotational angle of the rotatable barrel for each of the focusing regions.

3. The camera of claim 1, wherein the first lens group is provided on a side of a subject to be photographed with respect to the second lens group.

4. The camera of claim 1, wherein a feeding amount of the first lens group in the focusing region on a telephoto side is larger than a feeding amount thereof in the focusing region on a wideangle side.

5. A camera comprising:

a first lens group which executes focusing operation;

a second lens group which moves relative to the first lens group to execute zooming operation; and a lens barrel which carries the first lens group and the second lens group, so that each of the first lens group and the second lens group can move along a zooming line including a plurality of focusing regions and a plurality of zooming regions in which a focusing region and a zooming region alternate with each other, wherein a whole zooming area including the plurality of focusing regions and the plurality of zooming regions is divided into a plurality of zooming sub-areas, and wherein a feeding amount of the first lens group in one of the zooming sub-areas is different from that of the first lens group in one of the others of the zooming sub-areas.

6. The camera of claim 5, wherein the lens barrel comprising:
- a fixed barrel which is immobilized relative to a body of the camera; and
- a rotatable barrel which can rotate relative to the fixed barrel,
- wherein, the first lens group is fed linearly relative to a rotational angle of the rotatable barrel for each of the zooming sub-areas.

7. The camera of claim 5, wherein the first lens group is provided on a side of a subject to be photographed with respect to the second lens group.

8. The camera of claim 5, wherein, in each one of the focusing regions which belong to one of the zooming sub-areas, the forwarding amounts of the first lens group is equal to each other.

9. The camera of claim 5, wherein a feeding amount of the first lens group in the zooming sub-area on a telephoto side is larger than a feeding amount thereof in the zooming sub-area on a wideangle side.

10. A zoom camera comprising:
- a camera body; and
- a zoom lens barrel which is mounted on the camera body,
- wherein the zoom lens barrel comprises:
    - a fixed barrel which is stationary relative to the camera body;
    - a rotatable barrel which is connected to the fixed barrel via a helicoid and which is linearly fed relative to the fixed barrel with its rotating relative to the fixed barrel in a whole zooming area; and
    - a plurality of lens groups that include a focusing lens group, each of which moves along a zooming line including a plurality of focusing sections and a plurality of zooming sections in which a focusing section and a zooming section alternate with each other, and that move in a direction of an optical axis relative to the rotatable barrel with their changing relative position when the rotatable barrel is forwarded,
- wherein, in each of the focusing sections, the focusing lens group is linearly fed relative to a rotational angle of the rotatable barrel,
- wherein the whole zooming area including the focusing sections and the zooming sections is divided into a wideangle-side zooming sub-area and a telephoto-side zooming sub-area,
- wherein, in the focusing sections which belong to one of the wideangle-side zooming sub-area and the telephoto-side zooming sub-area, the forwarding amounts of the focusing lens group relative to the rotational angle of the rotatable barrel in the focusing sections are equal to each other, and the forwarding amounts of the focusing lens group relative to the rotational angle of the rotatable barrel in the wideangle-side zooming sub-area and in the telephoto-side zooming sub-area are different from each other,
- wherein, in the wideangle-side zooming sub-area, the focusing lens group does not move relative to the rotatable barrel, and
- wherein, in the telephoto-side zooming sub-area, a helicoid formed on a carrying frame for the focusing lens group and a helicoid formed on the rotational barrel cooperates with each other, so that the focusing lens group is linearly fed relative to the rotational barrel.

* * * * *